United States Patent

Wussow et al.

[11] Patent Number: 5,250,112
[45] Date of Patent: Oct. 5, 1993

[54] SPINEL BLACK PIGMENTS BASED ON COPPER-CHROMIUM-MANGANESE MIXED OXIDES, A PROCESS FOR THEIR PREPARATION AND THEIR USE

[75] Inventors: Klaus Wussow, Siegen; Peter Kuske, Krefeld; Manfred Mansmann, Leverkusen; Dieter Messer, Odenthal; Dieter Räde, Krefeld-Bockum, all of Fed. Rep. of Germany

[73] Assignee: Bayer Aktiengesellschaft, Leverkusen, Fed. Rep. of Germany

[21] Appl. No.: 979,769

[22] Filed: Nov. 20, 1992

[30] Foreign Application Priority Data

Dec. 5, 1991 [DE] Fed. Rep. of Germany ....... 4140118

[51] Int. Cl.$^5$ ............................................. C09C 1/34
[52] U.S. Cl. .................................... 106/453; 106/480
[58] Field of Search ............................... 106/453, 480

[56] References Cited

U.S. PATENT DOCUMENTS

| 2,248,021 | 7/1941 | Geary | 106/302 |
| 2,309,173 | 1/1943 | Diehl | 106/302 |
| 3,528,839 | 9/1970 | Weber | 106/453 |
| 4,205,996 | 6/1980 | Eppler | 106/302 |
| 5,080,718 | 1/1992 | Sullivan et al. | 106/401 |

FOREIGN PATENT DOCUMENTS 1296073  5/1969  Fed. Rep. of Germany .

OTHER PUBLICATIONS

Ullmanns Encyklopädie der technischen Chemi, Verlag Chemie, Weinheim 1979, 4th Edition, vol. 18, pp. 607–608.
P. A. Lewis, Pigment Handbook, John Wiley & Sons, New York 1988. 2nd Edition, vol. 1, pp. 777–784.
Gmelins Handbuch der anorganischen Chemie, Verlag Chemie, Weinheim 1973, 8th Edition, vol. 56, Part C1, p. 77.
DIN 55 986; Testing of pigments: determination of relative tinting strength and colour difference after colour reduction; colorimetric method 1983.
DIN 66 131; Determination of specific surface area of solids by gas adsorption using the method of Brunauer, Emmett and Teller (BET); fundamentals, 1973.
DIN 5033; Colorimetry; basic concepts, 1979.
DIN 6174; Colorimetric evaluation of colour differences of surface colours according to the CIELAB formula, 1979.
ISO/DIS 10527; CIE Standard colorimetric observers, 1989.
ISO/7724/1; Paints and varnishes—Colorimetry—Part 1: Principles, First Edition, 1984.
ISO/7724/2; Paints and varnishes—Colorimetry—Part 2: Colour measurement, First Edition, 1984.
ISO/7724/3; Paints and varnishes—Colorimetry—Part 3: Calculation of colour differences, First Edition, 1984.

*Primary Examiner*—Mark L. Bell
*Assistant Examiner*—Chris Gallo
*Attorney, Agent, or Firm*—Connolly & Hutz

[57] ABSTRACT

Spinel black pigments are prepared by annealing oxides, hydroxides or carbonates of copper, chromium and manganese and grinding the product. The manganese-yielding component is $Mn_3O_4$.

5 Claims, No Drawings

SPINEL BLACK PIGMENTS BASED ON COPPER-CHROMIUM-MANGANESE MIXED OXIDES, A PROCESS FOR THEIR PREPARATION AND THEIR USE

The present invention relates to spinel black pigments based on copper-chromium-manganese mixed oxides, to a process for their preparation and to their use.

Oxidic mixed phase pigments having a spinel structure have been known for a long time. The crystal structure of the colourless mineral spinel, $MgAl_2O_4$, offers numerous possibilities of substitution of the magnesium and aluminium, in particular by colour producing transition metals such as vanadium, chromium, manganese, iron, cobalt, nickel and copper, mixed oxides of the general formula $AB_2O_4$ being thereby obtained in a wide variety of colour shades [Ullmanns Encyklopädie der technischen Chemie, Verlag Chemie, Weinheim 1979, 4th Edition, Volume 18, pages 607–608]. Deviations from the ideal stoichiometric proportions, $AB_2O_4$, are also known which are due to the fact that the spinel structure allows certain phase variations.

Mixed phase pigments are normally produced by subjecting an intimate mixture of the metal oxides, or of compounds which form the metal oxides when heated, to a solid state reaction at temperatures of from 800° to 1400° C. and then grinding the product.

Black pigments based on copper-chromium spinels $CuCr_2O_4$ have achieved particular technical importance. They are frequently modified by the incorporation of iron and/or manganese in the spinel lattice [P. A. Lewis, Pigment Handbook, John Wiley & Sons, New York 1988, 2nd Edition, Volume 1, pages 777–784]. Due to their excellent resistance to temperature, light, weather and chemicals, spinel black pigments are eminently suitable for pigmenting highly heat resistant lacquers (e.g. based on silicone resins) and Coil-Coat-Lacquers. For these applications they are sometimes mixed with white pigments for obtaining a variety of grey shades. They are also suitable for colouring plastics, porcelain enamels and ceramic glazes. Compared with carbon black pigments, they have better dispersion properties but substantially weaker tinting strength. The tinting strength according to DIN 55986 is a measure of the capacity of a colouring agent (e.g. a coloured pigment) to produce colour on other substances (e.g. white pigment) by virtue of its ability to absorb light.

U.S. Pat. No. 2,248,021 describes ceramic colouring agents consisting of oxides of copper and chromium in a molar ratio of chromium to copper of from 1.5:1 to 2.5:1, optionally containing up to 5% of manganese dioxide. U.S. Pat. No. 2,309,173 discloses black pigments of the copper-chrome type which are obtained by adding up to 15% of the metal oxides of iron, nickel, cobalt, manganese, molybdenum, tungsten, vanadium and/or uranium to a mixture of copper oxide and chromium oxide and calcining the resulting mixture at temperatures of from 800° to 1100° C.

The disadvantages of these pigments are their greyish tinge and their low tinting strength.

It is an object of the present invention to provide black pigments with a spinel structure based on copper-chromium-manganese mixed oxides which do not have the disadvantages mentioned above.

It has now been found that this problem may be solved particularly advantageously by using black pigments based on copper-chromium-manganese mixed oxides with a spinel structure having a copper content of from 13 to 25% by weight, preferably from 15 to 22% by weight, a chromium content of from 22 to 41% by weight, preferably from 25 to 36% by weight, and a manganese content of from 7 to 36% by weight, preferably from 14 to 30% by weight, characterised in that they have a brightness value $L^*$ in the CIELAB Colour system of from 57 to 61, determined on black pigments incorporated in lacquers after they have been mixed with five times their quantity of titanium dioxide white pigment.

The black pigments according to the invention are distinguished by the fact that they have substantially lower brightnesses $L^*$ when brightened by a white pigment than pigments which have been produced by conventional processes. This brightness $L^*$ may serve as measure of the tinting strength of the pigments. A low $L^*$ value indicates that the black pigment has a high absorption capacity for visible light and is therefore particularly efficient in imparting colour to other substances.

The pigments according to the invention are obtained by annealing a mixture of oxides of copper, chromium and manganese or of compounds which yield the corresponding oxides when heated, e.g. hydroxides or carbonates, optionally with the addition of mineralizing agents such as sodium borate, boric acid or boron oxide. The component yielding manganese is $Mn_3O_4$. This must be regarded as surprising since the use of reactive oxides or of oxide-forming manganese compounds having a high specific surface area such as are normally used for the preparation of pigments, e.g. natural $MnO_2$ (pyrolusite), synthetic $MnO_2$ (battery quality) or $MnCO_3$, gives rise to inferior pigment qualities, i.e. pigments with low tinting strength and a greyish tinge.

$Mn_3O_4$ is produced in known manner by the oxidation of manganese(II) compounds from solution [Gmelins Handbuch der anorganischen Chemie, Verlag Chemie, Weinheim 1973, 8th Edition, Volume 56, Part C1, page 77, and literature cited therein].

The present invention also relates to a process for the preparation of the black pigments according to the invention. This is a process for the preparation of spinel black pigments by annealing a mixture of oxides, hydroxides and/or carbonates of copper, chromium and manganese, optionally with the addition of mineralizing agents, at temperatures of from 750° to 900° C. and grinding the furnace products and optionally washing and drying, $Mn_3O_4$ being the component which provides the manganese.

Preparation of the mixture of pigment raw materials according to the invention is preferably carried out in aqueous suspension as this eliminates the need for drying and grinding the wet $Mn_3O_4$ obtained. However, the $Mn_3O_4$ may be dried and ground and then mixed with the other starting materials in a dry state, e.g. in a high speed mixer. When the preferred method of wet mixing is employed, the washed filter cake is resuspended in water.

After the addition of the copper and chromium component, a homogeneous suspension is prepared with intensive stirring. Mixing apparatus operating on the rotor-stator principle are particularly suitable for this purpose. The suspension is then dewatered, for which purpose filter presses, decanting centrifuges or the like may be used. After the filter cake has been dewatered, it may be dried by conventional methods, preferably using hot gas driers such as spray driers or spin flash driers and contact driers. The filter cake or the dry substance is then calcined. Both directly heated and indirectly heated furnaces are suitable for calcining, e.g. continuously operating rotary furnaces, annular hearth furnaces, sliding bat furnaces, tunnel furnaces or intermittently operated rotary drum furnaces and chamber furnaces. Annealing temperatures of from 750° C. to 900° C. have proved to be suitable for the formation of copper-chromium-manganese mixed oxide. The reaction times are, of course, longer at low temperatures than at higher temperatures and vary from 8 hours to 30 minutes.

After calcination, the oven clinker is ground to the fineness of pigments. Grinding may be carried out either dry or in aqueous suspension. Jet mills, for example, are suitable for dry grinding, but wet grinding, e.g. in ball mills with stirrers, is preferred for technical reasons, optionally after preliminary size reduction. This preliminary size reduction may be carried out e.g. in ball mills.

After wet grinding, the pigment suspension is dewatered, washed and dried. The agglomerates formed in the drying process are finally broken down by dry grinding, for example in impact disc mills, pinned disc mills or jet mills.

The pigments according to the invention are characterised by brightness values L* of from 57 to 61, determined on coloured lacquers after the pigments have been mixed with five times their quantity by weight of $TiO_2$ white pigment. In addition, the pigments according to the invention are distinguished by a low brightness value in the pure shade.

The invention also relates to the use of the black pigments for pigmenting lacquers and for colouring plastics, porcelain enamels and other low melting glass fluxes.

The invention will now be described with the aid of Examples, which are not to be taken as limiting the invention.

EXAMPLES

Preparation of $Mn_3O_4$:

2 $m^3$ of $MnSO_4$ solution at a concentration of 600 g of $MnSO_4.H_2O/l$ are diluted with 7.5 $m^3$ of water in a heatable stirrer vessel with gas inlet. The pH is adjusted to 11 by the addition of 395 l of 45% sodium hydroxide solution. The resulting suspension of $Mn(OH)_2$ is then heated to 80° C. and gassed with 70 $m^3$ of air per hour for 6 hours. The solid substance obtained is filtered off and washed. According to X-ray diffraction analysis, the product is phase pure $Mn_3O_4$ with Hausmannite structure. The manganese content of the moist filter cake is 40%. The specific surface area (determined according to BET-$N_2$-1-point method DIN 66131) of the material which has been dried at 130° C. is 10 $m^2/g$.

EXAMPLE 1

660 kg of the $Mn_3O_4$ filter cake obtained as described above are worked up into a homogeneous suspension with 365 kg of $Cr_2O_3$ GN (Product of Bayer AG), 332 kg of $CuCO_3.Cu(OH)_2.xH_2O$ (46% Cu, Product of Th. Goldschmidt AG), 9 kg of $Na_2B_4O_7.5H_2O$ and 1000 l of water, using a rotor-stator mixer. The mixture is dried and calcined for 6 hours at 800° C. in an oxidizing atmosphere in a rotary drum furnace. The furnace clinker is first size reduced wet in a ball mill and then fine ground in a cascade of pearl mills. An intensely black pigment with high tinting strength, as indicated by a low CIE-LAB brightness L* of the mixture with the whit pigment (see Table 1), is obtained after drying and disagglomeration.

The composition of the pigment is 16.5% Cu, 27.0% Cr and 28.6% Mn. According to X-ray diffraction analysis, the pigment has a spinel structure.

EXAMPLE 2

The procedure is the same as in Example 1 but the copper component used is CuO in a quantity of 191 kg. A deep black pigment with high tinting strength (see Table 1) and spinel structure is again obtained. The composition of the pigment is similar to that of the product from Example 1.

EXAMPLE 3

165.8 g of $CuCO_3.Cu(OH)_2.xH_2O$ (46% Cu), 182.4 g of $Cr_2O_3$ (chromium oxide GN, Product of Bayer AG), 330,0 g of the $Mn_3O_4$ filter cake prepared as described above, 4 g of $Na_2B_4O_7.5H_2O$ and 600 ml of water are mixed homogeneously in a rotor-stator mixer.

The suspension is filtered, dried and then annealed at 800° C. for one hour in a laboratory batch furnace. 80 g of the furnace product are size reduced in a laboratory ball mill with 140 ml of water for 30 minutes and the suspension thus obtained is then stirred for 10 minutes at 2000 revs/min in a laboratory ball mill equipped with stirrer containing 320 ml corresponding to 600 g of grinding media (average diameter 0.7 mm). The grinding media are separated off and the suspension is filtered, washed, dried and dis-agglomerated. A deep black pigment of high tinting strength (see Table 1) and spinel structure is obtained. The composition of this pigment is comparable to that of the product from Example 1.

EXAMPLE 4

127.3 g of CuO, 243.4 g of $Cr_2O_3$ (chromium oxide GN, Product of Bayer AG), 164.8 g of the $Mn_3O_4$ filter cake prepared as described above, 4 g of $H_3BO_3$ and 600 ml of water are homogeneously mixed in a rotor-stator mixer. The product is then treated as described in Example 3. A deep black pigment of high tinting strength (see Table 1) and spinel structure is obtained. The pigment has the following composition: 22.0% Cu, 36.0% Cr and 14.3% Mn.

EXAMPLE 5

111.4 g of CuO, 212.8 g of $Cr_2O_3$ (chromium oxide GN, Product of Bayer AG), 247.2 g of the $Mn_3O_4$ filter cake prepared as described above, 4 g of $H_3BO_3$ and 600 ml of water are homogeneously mixed in a rotor-stator mixer. The product is then treated as described in Example 3. A deep black pigment of high tinting strength (see Table 1) and spinel structure is obtained. The pigment has the following composition: 19.3% Cu, 31.6% Cr and 21.4% Mn.

EXAMPLE 6 (COMPARISON EXAMPLE)

The procedure is the same as in Example 3 but the manganese component is a commercially available natural manganese dioxide used in a quantity of 253.6 g. The manganese dioxide has a manganese content of 52% and a specific surface area (SSA) of 24 $m^2/g$. The pigment obtained has a chemical composition comparable to that of the product from Example 3 but it has a grey tinge and considerably less tinting strength than the pigments from Examples 1 to 5, as can be seen from its high brightness value L*. It thus corresponds to conventional technical spinel black pigments based on copper-chromium-manganese mixed oxides (see Table 1).

EXAMPLE 7 (COMPARISON EXAMPLE)

The procedure is the same as in Example 3 but the manganese component is a finely divided manganese carbonate (44.5% Mn, SSA=30 m$^2$/g) used in a quantity of 296.3 g. The resulting pigment has a chemical composition comparable to that of the product from Example 3 but has a grey tinge and considerably less tinting strength than the pigments from Examples 1 to 5. It thus resembles conventional technical pigments (see Table 1).

EXAMPLE 8 (COMPARISON EXAMPLE)

The procedure is the same as in Example 3 but the manganese component used is a MnO$_2$ with a high specific surface are (100 m$^2$/g), of the kind used for the production of dry batteries. It has a manganese content of 60% and is used in a quantity of 219.8 g. The pigment thus prepared has a chemical composition comparable to that of the product from Example 3 but has a pronounced grey tinge and low tinting strength (see Table 1).

The pigments were incorporated in an air drying lacquer (Alkydal F 48, Product of Bayer AG) by means of an automatic pan muller. The pigment volume concentration was 10%. The pigmented lacquer was applied to white lacquered cardboard in a covering layer. The pure shade of the pigment is obtained by these means.

To assess the tinting strength of the pigment, it was brightened with a white titanium dioxide pigment (R-KB-2, Product of Bayer AG) in a ratio by weight of 1:5 as described above.

The colour of the dried lacquer was measured according to DIN 5033, using a spectral colorimeter (Standard Illuminant C, measuring geometry d/8, 2° standard observer). The CIELAB colour system according to DIN 6174 was used for evaluating the result.

In Table 1, pigments according to the invention (Examples 1 to 5) are compared by way of example with pigments which had been produced by a similar method but with other manganese-yielding starting materials conventionally used for the production of pigments (Examples 6 to 8) and conventional technical pigments.

The pigments according to the invention are characterised by brightness values L* in the range of from 57 to 61, determined on coloured lacquers after the pigments have been mixed with five times their weight of TiO$_2$ pigment. The L* values of conventional pigments are above 62 units.

The pigments according to the invention are also characterised by low brightness in the pure shade.

TABLE 1

| Pigment from Example | CIELAB brightness L* of the mixture with white (ratio by weight 1:5) |
| --- | --- |
| 1 | 58.2 |
| 2 | 59.4 |
| 3 | 57.0 |
| 4 | 60.5 |
| 5 | 59.6 |
| 6 (Comparison Example) | 62.4 |
| 7 (Comparison Example) | 62.7 |
| 8 (Comparison Example) | 62.5 |
| Technical Pigment 1[*] | 63.5 |
| Technical Pigment 2[*] | 62.5 |

[*]Technical pigment 1 is Black No. 101 of Shepherd Colour Company, USA. Technical pigment 2 is Daipyroxide 9570 of Dainichi Color & Chemicals Manufacturing, Japan.

What is claimed is:

1. Black pigments with spinel structure based on copper-chromium-manganese mixed oxides having a copper content of from 13 to 25% by weight, a chromium content of from 22 to 41% by weight, and a manganese content of from 7 to 36% by weight, characterized in that they have brightness values L* in the CIELAB Colour System of from 57 to 61, determined on black pigments incorporated in lacquers after they have been mixed with five times their quqntity of titanium dioxide white pigment wherein Mn$_3$O$_4$ is used to provide the manganese.

2. Black pigments as claimed in claim 1, having a copper content of 15–22% by weight, a chromium content of 25–36% by weight, and a manganese content of 14–30% by weight.

3. A process for the preparation of spinel black pigments, comprising annealing a mixture of oxides, hydroxides or carbonates of copper, chromium and manganese, optionally with the addition of mineralizing agents, at temperatures of from 750° to 900° C. and grinding and optionally washing and drying the furnace products, wherein the manganese yielding component is Mn$_3$O$_4$.

4. A process according to claim 3, wherein the Mn$_3$O$_4$ component has been prepared by the oxidation of manganese(II) compounds from solution.

5. Spinel black pigments produced by the process as claimed in claim 3.

* * * * *